United States Patent [19]

Deren

[11] 4,164,542
[45] Aug. 14, 1979

[54] DETINNING PROCESS

[76] Inventor: Pincus Deren, 712 E. Hampton Rd., Milwaukee, Wis. 53217

[21] Appl. No.: 529,611

[22] Filed: Dec. 5, 1974

Related U.S. Application Data

[63] Continuation of Ser. No. 458,085, Apr. 5, 1974, abandoned, which is a continuation of Ser. No. 251,408, May 8, 1973, abandoned.

[51] Int. Cl.$^2$ .................................................. C01G 19/00
[52] U.S. Cl. ........................................................... 423/90
[58] Field of Search ............... 423/90, 98, 593; 75/98; 204/121

[56] References Cited

U.S. PATENT DOCUMENTS

| | | | |
|---|---|---|---|
| 1,018,734 | 2/1912 | Weber | 423/90 |
| 1,511,590 | 10/1924 | Buttfield | 204/121 |
| 1,592,935 | 7/1926 | Hickey | 423/90 |
| 2,011,305 | 8/1935 | Smith | 423/90 |

OTHER PUBLICATIONS

Kirk-Othmer Encyclopedia of Chemical Technology, 2nd Edition, vol. 20, John Wiley & Sons, Inc., 1969, pp. 296-301.
Mantell, C. L. TIN, Chemical Catalog Company, Inc., New York, 1929, pp. 338-340.

*Primary Examiner*—Brian Hearn
*Attorney, Agent, or Firm*—Michael, Best & Friedrich

[57] ABSTRACT

Scrap tin plate is detinned in a continuous process by conveying it through a detinning bath containing concentrations of sodium hydroxide and of sodium nitrate or sodium nitrite which are substantially higher than standard practice. The solution is heated to a temperature higher than is used in standard practice. With this relatively high concentration and temperature the tin reacts with the sodium salts in the solution to form sodium stannate, which precipitates out of the solution and is continuously separated therefrom in a centrifuge or filter press. The detinned scrap is rinsed with water as it emerges from the detinning bath and the used rinse water drains into the detinning bath to serve as a makeup liquid.

2 Claims, 3 Drawing Figures

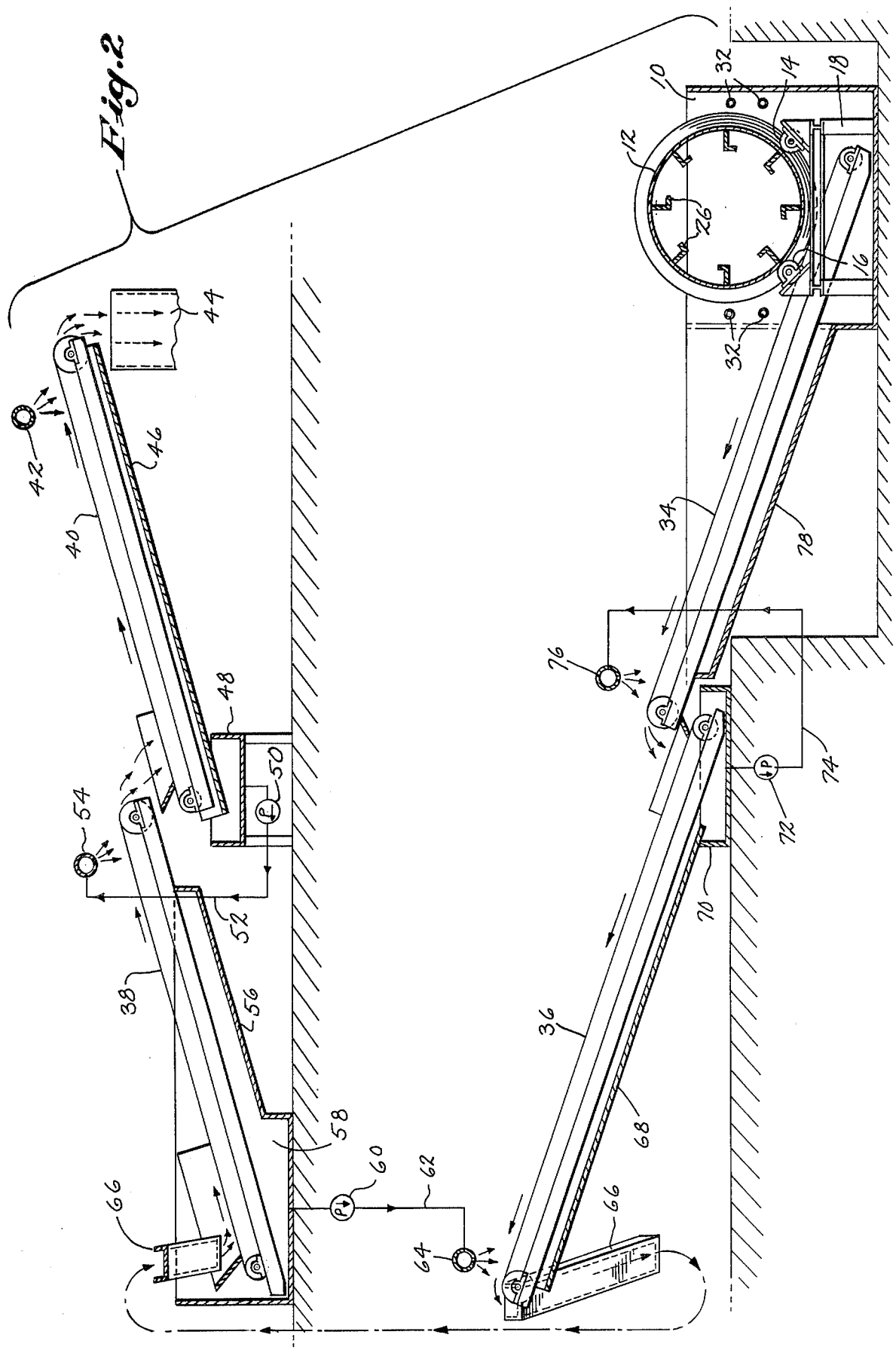

DETINNING PROCESS

This is a continuation of application Ser. No. 458,085, filed Apr. 5, 1974, which in turn is a continuation of application Ser. No. 251,408, filed May 8, 1973, both abandoned.

BACKGROUND OF THE INVENTION

This invention relates to the detinning of scrap tin plate in an aqueous solution of sodium salts. In the past, an aqueous solution of 12%–14% sodium hydroxide by weight and 1½%–2% sodium nitrite by weight has been used in batch detinning operations, the solution being heated to a temperature of approximately 210° F. Heretofore it was common practice to use sodium nitrite instead of the less expensive sodium nitrate because, in the batch operations, sodium nitrite is faster, and the batch process as heretofore carried out was found to be very slow in any event. A batch of scrap tin plate was immersed in the heated solution until all of the tin thereon had been changed to sodium stannate. This required an immersion period of approximately two and one-half hours. The detinned scrap was then removed from the detinning bath and a fresh batch of scrap tin plate was immersed therein. This was repeated until the amount of sodium stannate in the solution approached the saturation point for sodium stannate in the solution under the above-noted conditions. At that time the solution was pumped to a clean tank and the sodium stannate was removed by electrolysis or by adding sulphuric acid or other acids to the solution for the production of tin oxide.

The above-noted process can be speeded up by raising the temperature of the solution, but since the solution is already operated near its boiling point, the boiling point of the solution would have to be first raised by increasing the concentration of sodium salts therein. This was not done in the past, however, because increasing the concentration of sodium salts reduced the percentage of sodium stannate that could be held in the solution and caused the sodium stannate to precipitate out of the solution and fall to the bottom of the tank, where it mixed with dirt and other foreign matter and became almost impossible to recover.

In accordance with this invention, however, it has been discovered that the immersion time for the scrap tin plate can be reduced from two and one-half hours to a period as short as eight to twenty minutes by using the combination of higher concentrations of sodium salts, higher temperatures, and continuous removal of the precipitated sodium stannate out of the solution in a centrifuge or filter press.

Accordingly, the principal object of this invention is to provide a detinning process which is significantly faster than those heretofore known in the art.

Another object of this invention is to provide a detinning process which may be a continuous process.

A further object of this invention is to provide a detinning process in which tin is removed from the detinning solution by continuously precipitating out sodium stannate crystals and separating them from the solution.

An additional object of this invention is to provide a detinning process of the above-noted character which is less expensive than those heretofore known in the art and which permits the efficient use of the less expensive sodium nitrate instead of the more expensive sodium nitrite.

Yet another object of the invention is to provide a detinning process in which scrap tin plate is continuously conveyed through a detinning bath rather than being inserted therein in batches.

SUMMARY OF THE INVENTION

In accordance with this invention, the above-noted objects are attained by providing a detinning bath containing a relatively strong aqueous solution of sodium hydroxide and sodium nitrate or sodium nitrite to raise its concentration and boiling point, the solution being heated to a temperature near its higher boiling point and the precipitated sodium stannate being continuously separated therefrom. In the preferred embodiment scrap tin plate is continuously conveyed through the detinning bath and the tin reacts with the sodium salts in the solution to form sodium stannate, which precipitates out of the solution and is continuously separated therefrom in a centrifuge or filter press. The detinned scrap is rinsed with water as it emerges from the detinning bath and the used rinse water is fed into the process to serve as a makeup liquid.

BRIEF DESCRIPTION OF THE DRAWINGS

FIG. 2 is a view principally in vertical section showing the two parts of the apparatus diagrammatically interconnected.

DETAILED DESCRIPTION OF THE INVENTION

Figure 1:
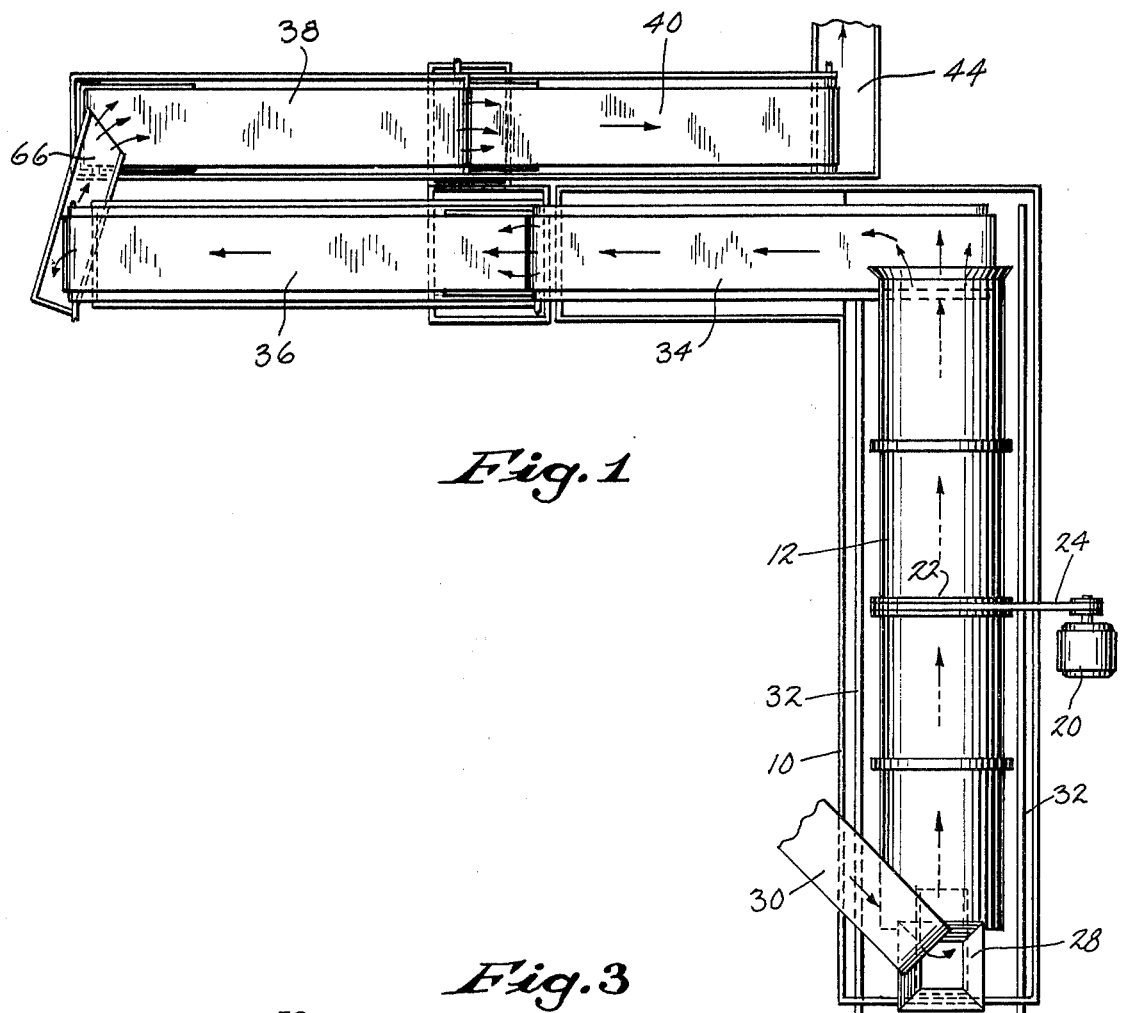
FIG. 1 is a plan view of apparatus for carrying out one illustrative process of this invention.

Referring to FIGS. 1 and 2, a detinning tank 10 has a rotary drum 12 immersed therein. The rotary drum 12 is rollably supported upon rollers 14 and 16 (see FIG. 2) which are mounted on a supporting structure 18. The rotary drum 12 can be rotated by means of an electric motor 20 (see FIG. 1) which is coupled by a drive chain 24 to a sprocket 22 formed around the rotary drum 12.

Within the interior of the rotary drum 12 are flights 26 (see FIG. 2) which are arranged in a spiral pattern so that as the rotary drum 12 is rotated, scrap tin plate in the interior of the drum will be conveyed from one end of the drum to the other while being tumbled. Scrap tin plate is introduced into one end of the rotary drum 12 by means of a funnel 28 which receives scrap tin plate from a conveyor 30.

The detinning tank 10 is preferably filled with a detinning solution containing a relatively high concentration of chemical additives. The total chemical additive content is not critical, being 20%–40%, but preferably being 22%–31%. Any concentration lower than this reduces the speed of operation, and concentrations higher than 40% use unnecessary amounts of chemicals. Nor is the temperature critical as lowering the temperature for a given concentration merely increases the time of the detinning operation. It is, however, important that the concentration and temperature of the detinning solution be such that the saturation point for sodium stannate is exceeded so as to cause precipitation of a substantial amount of sodium stannate. The chemical concentration preferably includes 18%–30% sodium hydroxide or potassium hydroxide, potassium hydroxide, however, not being favored because of its higher cost. The detinning solution also contains 2%–10% of sodium nitrate or sodium nitrite. The present invention makes it practical and possible to employ the less expensive sodium nitrate, because of the novel combination of higher chemical concentrations and higher temperature, accompanied by the removal of precipitated sodium stannate. The above concentration is to be distinguished from the commonly-employed 12%–14% of sodium hydroxide and 1½%–2% of sodium nitrate or sodium nitrite. This high concentration of the present invention permits heating to 226°–236° F. (instead of the usual 210° F.) by means of heating tubes 32 which extend along the sides of the detinning tank 10. The scrap tin plate which is dumped from the conveyor 30 into the funnel 28 discharges into the interior of the rotary drum 12 and is carried therethrough by means of the spiral flights 26. While the scrap tin plate is being carried through the rotary drum 12 it is being thoroughly washed in the detinning solution so that all of the tin on the scrap tin plate can react with the sodium salts in the solution to form sodium stannate. The pitch of the spiral flights 26 within the rotary drum 12 is arranged so that the scrap tin plate will take approximately as much time in being driven through the rotary drum 12 from one end to the other as is necessary for the complete dissolving of all of the tin plate thereon. The sodium stannate which is precipitated in the detinning solution is removed from the solution into a centrifuge or filter press as will be described later.

At the outlet end of the rotary drum 12, the detinned scrap is deposited upon an inclined conveyor 34 which is the first of a series of inclined conveyors that include the additional conveyors 36, 38, and 40. The scrap delivered to the top of the last conveyor 40 is rinsed by fresh water piped into a manifold 42 from a suitable source, said manifold having suitably arranged holes for spraying the water onto the conveyor 40. After being rinsed clean by the spray manifold 42, the scrap tin plate drops off the end of the conveyor 40 into a slide chute 44.

The conveyor 40 has a drip pan 46 thereunder which drains into a rinse tank 48 at the lower end of the conveyor. The upper end of conveyor 38 overhangs the beginning of conveyor 40. The scrap which is about to be discharged from the end of conveyor 38 onto the beginning of the conveyor 40 is rinsed by liquid pumped by a pump 50 through a conduit 52 to a spray manifold 54 which is positioned above the end of the conveyor 38. Part of the rinse water discharged from the manifold 54 falls into the rinse tank 48, and the remainder runs down a drip pan 56 into another rinse tank 58. The liquid in the rinse tank 58 is pumped out by a pump 60 through a conduit 62 to another spray manifold 64 which is positioned above the end of another conveyor 36. The scrap metal that leaves the end of the conveyor 36 falls down a chute 66 which deposits the scrap at the beginning of the conveyor 38. It should be noted in FIG. 2 that the conveyors 38 and 40 are shown raised up from their actual position so as not to be hidden behind the conveyors 34 and 36. The relationship between the two conveyors is shown by the chute 66 and also by the floor level.

The rinse water sprayed from the spray manifold 64 is caught by a drip pan 68 and is conveyed downwardly to another rinse tank 70. The water from the rinse tank 70 is pumped by a pump 72 through a conduit 74 to another spray manifold 76 where it is sprayed upon the scrap just before it leaves the conveyor 34. The runoff of rinse water from the manifold 76 is caught in a drip pan 78 and is conveyed back to the detinning bath 10.

Figure 3:
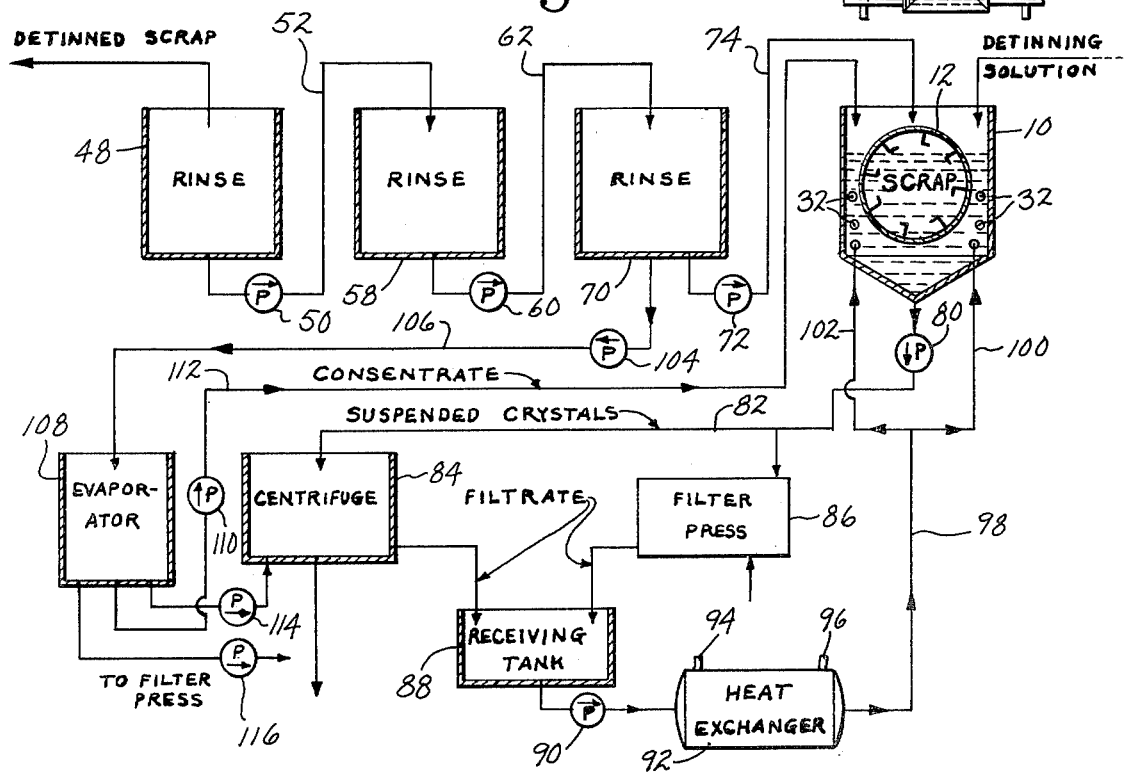
FIG. 3 is a block diagram showing one illustrative process of this invention.

Referring to FIG. 3, the detinning solution from the tank 10 is continuously pumped by means of a pump 8 through a conduit 82 to a centrifuge 84 or to a filter press 86 where the sodium stannate crystals which have precipitated out of the solution are separated from the liquid in the solution. The liquid discharged from the centrifuge 84 or from the filter press 86 is discharged into a receiving tank 88. From the receiving tank 88, the solution is pumped by a pump 90 to a heat exchanger 92 which has a steam inlet port 94 and a steam outlet port 96. The steam inlet and outlet ports 94 and 96 are coupled to a suitable source of steam which is not shown in the drawings. After leaving the heat exchanger, the fluid is pumped by the pump 90 through conduits 98, 100, and 102 to suitable inlet openings in the bottom of the detinning tank 10.

In cases where the rinse water that drains back into the detinning tank 10 is more than adequate to make up for lost liquid, a portion of the rinse water may be drawn off by a pump 104 through a conduit 106 to an evaporator tank 108, where the weak solution can be concentrated by evaporation of water from the tank. The concentrated solution from the evaporator tank 108 may then be pumped by a pump 110 through a conduit 112 back to the detinning tank 10 when needed. Portions of the concentrated fluid in evaporator tank 108 can be also pumped to the centrifuge 84 by means of a pump 114 and to the filter press 86 by means of a pump 116.

In the preferred process the detinning solution which is contained in the detinning tank 10 contains approximately 18%–30% sodium hydroxide by weight and approximately 2%–10% of sodium nitrate by weight. This higher concentration of solution raises the boiling point, which with the present invention lies between 226°–236° F. but which can be higher at the start of an operation. In the solution the scrap tin plate can be completely detinned in from eight to twenty minutes. A somewhat higher temperature, such as 250° F., is preferably used for a short period at the start of an operation to speed up the initial effectiveness of a freshly made up detinning solution to give a bright metallic surface to the detinned scrap. After a suitable initial period, enough water is added to bring the solution down to the range of 226°–236° F.

While it is an important feature of the present invention to carry out a continuous process as described and illustrated, the invention may nevertheless be adapted to a batch process wherein the scrap material is subjected to the higher concentrations and temperatures, with the sodium stannate which is precipitated out being removed, and it was found that when the temperature of the detinning solution was raised above a certain degree the sodium nitrate became very effective as an addition reagent to the alkaline solution in promoting the rapid solubility of the tin coating. It was found that temperatures between 226° and 236° F. were very effective in rapidly dissolving the tin coating. At the above temperatures a reaction takes place that the sodium nitrate becomes a very effective reagent in the detinning process. It was also found that the evolution of gas and the effectiveness of the oxidizing reagents was greatly increased with the increased temperatures.

The following examples confirm that tin scrap can be successfully detinned within a time period of twenty minutes or below:

1. Tin-coated scrap was immersed into a solution containing 24% of NaOH-Caustic soda and 3% of NaNO$_3$ (sodium nitrate). The scrap was loose to assure that all tin-coated surfaces came into contact with the solution. The solution was at its boiling point. There was soon an evolution of gas and within ten minutes the tin on the surface of the metal was completely dissolved. The scrap used had a heavy tin coating about twenty pounds per ton. This type of tin plate is usually used to make milk cans.

2. Shredded or loose tin plate scrap was introduced into a water solution containing 25% of NaOH and 4% of NaNO$_3$ at its boiling point. The tin coating dissolved in eight minutes.

3. Loose tin scrap was introduced into a water solution containing 27% of NaOH and 3% of NaNO$_3$ at the boiling point of the solution. The tin coating dissolved in seven to eight minutes.

4. Loose tin scrap was introduced into a hot water solution containing 29% of NaOH and 2% of NaNO$_3$. The tin coating dissolved in six minutes.

5. Loose tin scrap was introduced into a water solution containing 22% of NaOH and 3% of sodium nitrite NaNO$_2$. The solution was brought to practically its boiling point. The tin coating dissolved in seven minutes.

6. Loose tin plate scrap was introduced into a hot water solution containing 19% of NaOH and 10% of sodium nitrate NaNO$_3$. The solution was brought close to the boiling point. The tin coating dissolved in six minutes resulting in a bright shiny metallic surface of the base metal. The scrap used was heavy plate usually used in making milk cans.

7. Loose and shredded tin plate scrap was introduced in a hot water solution containing 18% of NaOH and 4% NaNO$_3$. After detinning several samples at the boiling point the tin coating dissolved in seven minutes resulting in a clear shiny surface of the base metal.

8. Loose and shredded tin plate scrap was introduced into a hot water solution containing 18% NaOH and 4% of sodium nitrite NaNO$_2$. The tin coating dissolved in six minutes.

In general, it was found that all the solutions were more effective at their boiling point.

Although this invention has been described in connection with specific embodiments thereof, it should be understood that the method is not limited to the disclosed embodiments, since many modifications can be made in the disclosed process without changing its fundamental principles of operation. Accordingly, it should be understood that this invention includes all such modifications as fall within the scope of the following claims.

What I claim is:

1. A process for rapidly detinning a tin-plated scrap metal to produce a detinned base metal having a shiny metallic surface comprising the steps of immersing the scrap metal into a vessel containing an aqueous detinning solution including essentially 18–30% sodium hydroxide and 2–10% sodium nitrate or sodium nitrite for a time period up to about 20 minutes so as to completely dissolve the tin-plating from the base metal, said detinning solution being preconditioned at the start up of an operation to increase its initial effectiveness to dissolve the tin-plating by temporarily raising the temperature thereof to a level substantially above 236° F. and a sufficient amount of water thereafter is added to the aqueous detinning solution to lower the temperature thereof to between 226 and 236° F. so as to exceed the saturation point of the sodium stannate formed therein and cause precipitation of said sodium stannate; and continuously removing said precipitated sodium stannate from said detinning solution while the scrap metal is immersed therein.

2. A process according to claim 1 wherein said preconditioning temperature is about 250° F.

* * * * *